United States Patent
Zoldi et al.

(10) Patent No.: US 11,694,292 B2
(45) Date of Patent: Jul. 4, 2023

(54) SOFT SEGMENTATION BASED RULES OPTIMIZATION FOR ZERO DETECTION LOSS FALSE POSITIVE REDUCTION

(71) Applicant: FAIR ISAAC CORPORATION, Roseville, MN (US)

(72) Inventors: Scott Michael Zoldi, San Diego, CA (US); Qing Lin, San Diego, CA (US)

(73) Assignee: FAIR ISAAC CORPORATION, Roseville, MN (US)

( * ) Notice: Subject to any disclaimer, the term of this patent is extended or adjusted under 35 U.S.C. 154(b) by 733 days.

(21) Appl. No.: 16/395,112

(22) Filed: Apr. 25, 2019

(65) Prior Publication Data
US 2020/0342556 A1 Oct. 29, 2020

(51) Int. Cl.
*G06Q 50/26* (2012.01)
*G06Q 40/00* (2023.01)
*G06F 40/30* (2020.01)
*G06Q 40/12* (2023.01)

(52) U.S. Cl.
CPC .......... *G06Q 50/26* (2013.01); *G06F 40/30* (2020.01); *G06Q 40/12* (2013.12)

(58) Field of Classification Search
CPC ........ G06Q 50/26; G06Q 40/12; G06F 40/30
See application file for complete search history.

(56) References Cited

U.S. PATENT DOCUMENTS

| 10,242,019 B1 | 3/2019 | Shan et al. |
| 2014/0180974 A1 | 6/2014 | Kennel et al. |
| 2017/0140384 A1 | 5/2017 | Zoldi et al. |
| 2018/0053188 A1 | 2/2018 | Zoldi et al. |
| 2018/0248895 A1 | 8/2018 | Watson et al. |

OTHER PUBLICATIONS

Latent Dirichlet Allocation by Biei, David M., Ng, Andrew Y. and Jordan, Michael I., published in Journal of Machine Learning Research 3 (2003) pp. 993-1022, 29 pages. (Year: 2003).*

* cited by examiner

*Primary Examiner* — Paul Danneman
(74) *Attorney, Agent, or Firm* — Mintz Levin Cohn Ferris Glovsky and Popeo, P.C.

(57) ABSTRACT

A system and method includes soft-segment based rules optimization that can mitigate the overall false positives while maintaining 100% true positive detection. The soft clustering allows real-time re-assignment of an account to a dominate archetype behavior, as well as rule optimization based on a logical order with more relaxation on thresholds for the most inefficient rules is performed within each archetype. The rule optimization provides false positive reduction compared to a baseline rule system. The method can be used to reduce false positives for any rule-based detection system in which the same true positive detection is required.

24 Claims, 7 Drawing Sheets

Archetype 2

| | False Positives Tagged by a Single Rule | True Positives Tagged by a Single Rule | False Positive Ratio |
|---|---|---|---|
| Rule 7 | o o o o o o o o o o o o o o o | x x | FPR 7 |
| Rule 4 | o o o o o o o o o o o o | x x | FPR 4 |
| Rule 6 | o o o o o o o o o | | FPR 6 |
| Rule 1 | o o o o o o o o | | FPR 1 |
| Rule 5 | o o o o o o o | | FPR 5 |
| Rule 2 | o o o o o o | | FPR 2 |
| Rule 3 | o o o o o | | FPR 3 |

FIG. 6

Archetype 2

| | False Positives Tagged by a Single Rule | True Positives Tagged by a Single Rule | False Positive Ratio |
|---|---|---|---|
| Rule 7 | OOOOOOOOOOOOOOOO | x x x | FPR 7 |
| Rule 4 | OOOOOOOOOOOOOO | x x | FPR 4 |
| ~~Rule 6~~ | ~~OOOOOOOOO~~ | | ~~FPR 6~~ |
| Rule 1 | OOOOOOOOOO | x | FPR 1 |
| Rule 5 | OOOOOOOO | x | FPR 5 |
| Rule 2 | OOOOOO | x | FPR 2 |
| Rule 3 | OOOOO | x | FPR 3 |

FIG. 7

SOFT SEGMENTATION BASED RULES OPTIMIZATION FOR ZERO DETECTION LOSS FALSE POSITIVE REDUCTION

TECHNICAL FIELD

This disclosure relates generally to rule-based financial crime detection and, more particularly, systems and methods for detecting money laundering and fraud while reducing false positive detections.

BACKGROUND

Typically, in systems for detecting financial crime risk within streams of electronic transactions, operators of the system may utilize rules to identify high risk transactions that require actions, which include verifying the transaction, blocking the transaction, or investigating a customer or account, as examples. Transactions, accounts, and customers identified for review are determined by rules crossing or exceeding a certain risk threshold. These actions, when based on rules-based systems, are often not efficient in detecting true positives, and typically produce large volumes of false positive transactions, accounts, and customers. In some areas of focus for financial institutions, such as anti-money laundering, the large number of false positives results in huge numbers of human staff required to work through volumes of false positives. In nearly all instances, financial institutions are looking to maintain high true positive detection while reducing false positives.

In some fields, analytic models are built on original systems to reduce false positives and to yield a changed set of true positives (typically larger) where there are more true positives and lower false positives. In these analytic models, the true positives detected are not always a superset that includes the original system's true positives. In areas such as fraud this is considered acceptable, where 2-3 frauds from the original system may not be detected, but 200-300 new true positive frauds may replace them, resulting in many more frauds detected. In the area of money laundering, however, there are different constraints and one may insist that the new or newly tuned system exactly match the true positives of the original system (despite not capturing new true positives). This requirement in such constrained systems is unduly restrictive and non-optimal.

SUMMARY

A system and method described herein focuses on soft-segment based rules optimization that can mitigate the overall false positives while maintaining 100% true positive detection. The soft clustering allows real-time re-assignment of an account to a dominate archetype behavior. Rule optimization based on a logical order with more relaxation on thresholds for the most inefficient rules is performed within each archetype. For the sampled data in this study, the rule optimization provides 11% false positive reduction compared to the baseline rule system. The method can be used to reduce false positives for any rule-based detection system in which the same true positive detection is required.

In one aspect, a system, method and computer program product includes operations that include receiving transaction data representing one or more transactions associated with each of one or more accounts, the data comprising categorical field data and continuous field data. The operations further include processing the transaction data using a topic model to determine semantic structures underlying the one or more transactions, and to determine entity behavior archetypes associated with the one or more accounts based on the determined semantic structures according to the topic model, the entity behavior archetypes representing transactional behavior patterns across all of the one or more accounts based on the transaction data, the topic model being trained using only non-financial crime accounts of the one or more accounts. The operations further include storing the entity behavior archetypes in a data store accessible by the computer processor, the storing including associating the entity behavior archetypes with each associated one or more accounts and associated transaction data. Accordingly, upon receiving new transaction data associated with one of the one or more accounts, the computer processor executing a Bayesian inference algorithm is configured to derive the updated latent archetypes from the new transaction data and the previous latent archetypes according to the entity behavior archetypes stored in the data store, the updated the entity behavior archetypes being associated with the one of the one or more accounts being available to the system and stored in the data store.

In some variations one or more of the following features can optionally be included in any feasible combination, wherein the behavior determined from the new transaction data based on the latent archetypes according to the entity behavior has a different distribution of false positives and true positives of financial crime detection based on the one or more accounts transaction behavior and the assigned entity behavior archetypes. A subpopulation of the one or more accounts can be associated with a dominant archetype. In some aspects, rule parameters of the financial crime detection system are adjusted based on the subpopulation of the one or more accounts that are assigned to each dominant archetype, and wherein the rule parameters are tuned to identify and remove false positives while maintaining full detection of true positives of the financial crime system. In yet other aspects, the tuning of the rule parameters comprises optimizing a first rule parameter that flags largest number of unique false positives while maintaining any true positives uniquely identified only by that rule. In still yet other aspects, the tuning of the first rule parameter removes unique false positives identified to cause a redistribution of unique false positives and unique true positives across other rules. In still yet other aspects, the operations include iterating through remaining rules until all rules uniquely identify at least one true positive, and where the rule parameters are adjusted where there are the largest number of unique false positives while maintaining the rule for true positive detection.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a money laundering detection system and method, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 6 shows rules ranked according to false positive ratio descending order for an archetype before optimization; and FIG. 7 shows rules ranked according to false positive ratio descending order for an archetype after removing a rule.

When practical, similar reference numbers denote similar structures, features, or elements.

DETAILED DESCRIPTION

The system and method described herein focuses on soft-segment based rules optimization that can mitigate the overall false positives while preserving the same true positive detection set. This soft-segmentation is obtained by using a topic model. Topic models are a category of statistical models and their associated computational estimators for uncovering underlying semantic structures based on (usually Bayesian) analysis of the words in documents describing the customer or account transaction activity. Latent Dirichlet Allocation (LDA), as one such topic model, is a preferred approach for aggregating consumers' transactions into different distinct transaction behaviors.

In accordance with some implementations described herein, a "document" can be a customer or an account, "words" can be defined based on the customer's history as the transaction stream of some categorical fields (e.g. Merchant Category Code and Point of Sale (POS) Entry Mode) combined with some continuous field (e.g. dollar amount), and which forms a unique dictionary of words across all customers. The "topics" learned by these systems indicate entity behavior archetypes. The archetypes learned by application of LDA based on this word dictionary of the transaction stream allow customer transactions to reveal transactional behavior patterns from intrinsic structure in their transaction data. The mapping from high-dimensional space of words to low-dimensional space of archetype probabilities is extremely powerful as it indicates the ability to associate similar customer types and behaviors learned only based on similarities among transaction behaviors, making it ideal in spaces such as anti-money laundering and fraud detection. Further, methods such as collaborative profiling allow for real-time update of the archetypes as a new word/event is associated with an account or customer's event stream.

In some implementations, during LDA training, only non-fraudulent accounts are used, which offers more stable archetypes over time than fraud behaviors. All the words seen by the LDA training accounts and their transaction history form a dictionary on which words are associated with archetypes at different probabilities, based on Bayesian association. At the end of LDA training, a global learned distribution for each word from the defined dictionary in the archetype space can be obtained. Then in the online environment, a Bayesian inference algorithm is used to derive the latent archetypes in the dataset from the defined dictionary of transaction events and their occurrence for an account. Each account is a mixture of archetypes based on the words in the account's history with an event-decay weighting. In other words, upon receiving streaming transaction data, the archetype mixture of an account is updated in real-time based on the word occurrence from the latest transaction, the account's historical words, and the word-archetype probability distribution learned in the LDA training.

Figure 1:
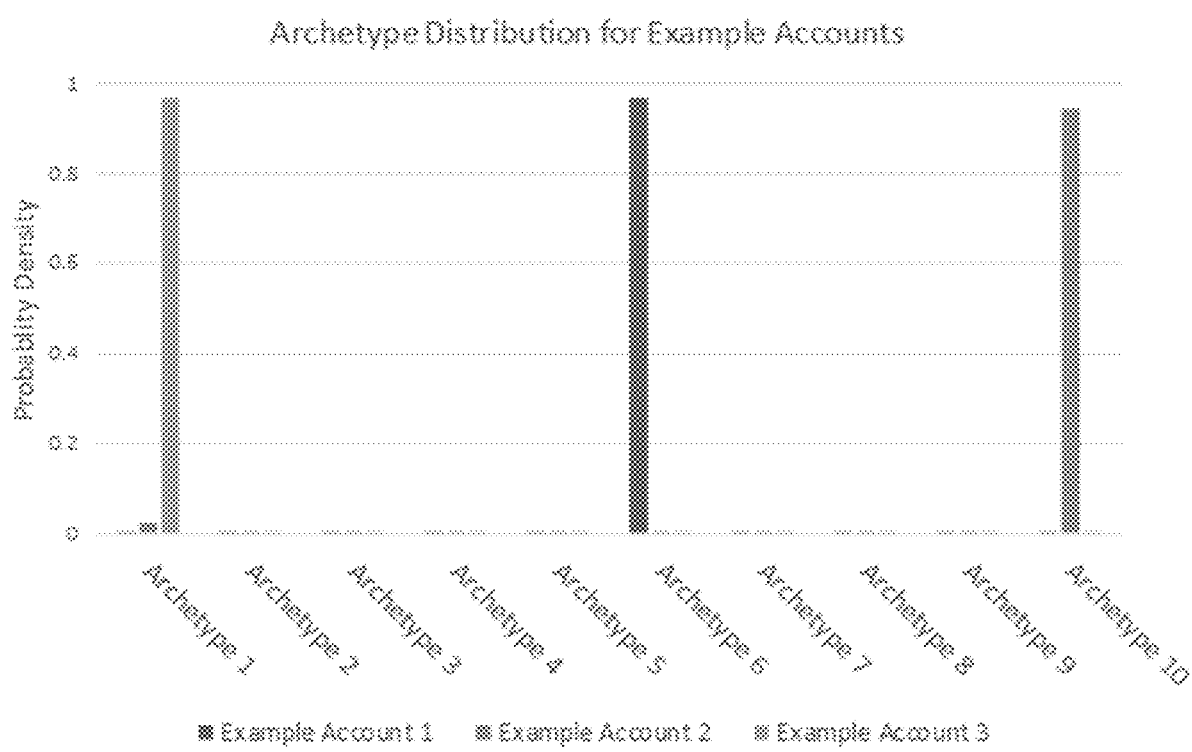
FIG. 1 illustrates examples of three accounts, each with a different dominating archetype, in accordance with implementations described herein.

As an example of the methodology, consider a soft-clustering LDA model using 6-months of real historical payment card data for about 267,000 non-fraud accounts, each of which includes 30 or more transactions during that period. In this example, there are about 3,000 defined words observed in the 6-month history which are composed by combining merchant category code (MCC), POS Entry Mode and five categorical dollar amount bins (small, medium, large, extra-large and extremely large). In learning the archetype distributions of each account, accounts start with an equal probability—in all archetypes, and as new transactions occurred the archetypes are updated forming a real-time continual update of the account in archetype space. FIG. 1 shows some examples of archetype distribution of accounts on an LDA based on 10 archetypes and how they are often dominated in archetype space by one of those 10 archetypes, depending on the word history of the transaction stream for that account. FIG. 1 shows three accounts demonstrating strong overlap in single archetypes with small distributions in the non-dominate remaining archetype space.

Figure 2:
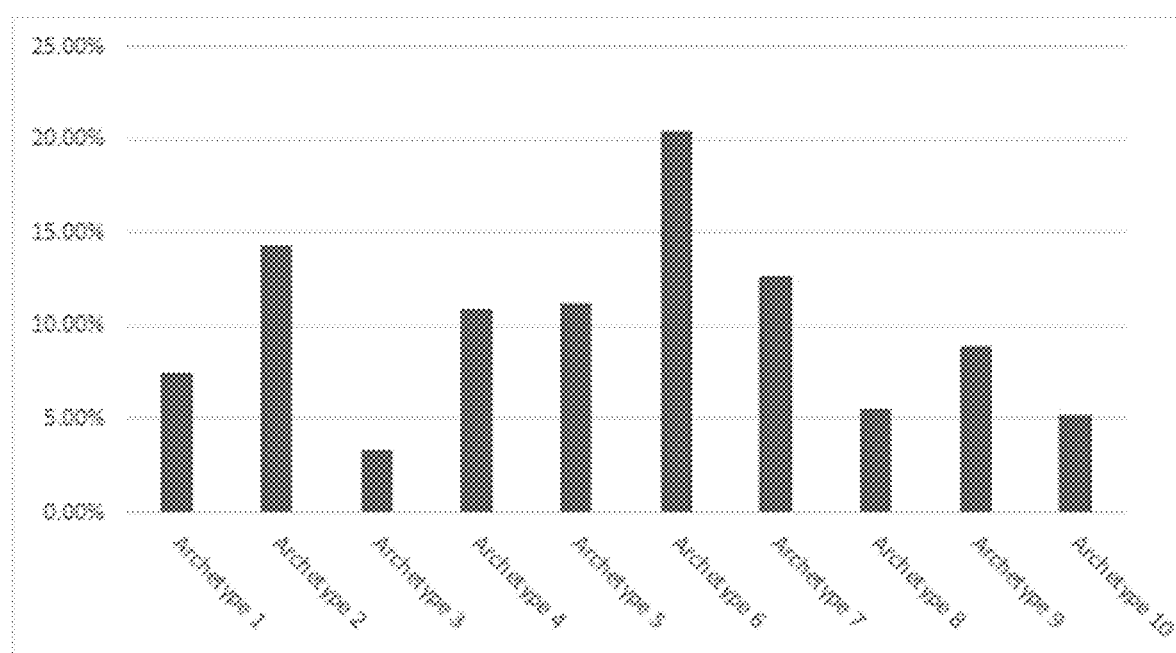
FIG. 2 illustrates an account volume distribution for all archetypes of the accounts shown in FIG. 1 by Month 6.

After 6 months of transaction monitoring, the archetype distributions of all the cards are assigned to a single archetype with the highest probability among the archetype distribution for that account. As shown in FIG. 2, about 20% of the accounts during the 6-month period were found to be in archetype 6, while only 3% were assigned to archetype 3. This asymmetrical distribution among all archetypes indicates the natural behavioral characteristics for the entity as each archetype describes different transactional behavioral patterns and automatically associates similar customers based on these transaction behaviors which occur in different densities in a population of customers.

Incoming transactions continue updating the account's archetype distribution. Typically, the archetype distribution remains stable for the majority of accounts. Therefore, from a rules optimization perspective, most accounts maintain their archetype association and it can be utilized for optimizing rule scenario threshold settings at the archetype level, versus at the global level.

Stability can be tuned based on the size of the documents that were used in the LDA model training. For example, in some implementations, a system can use 30 transactions. Table 1 shows changes in account dominant archetype assignment based on distinct behavioral change. Table 1 demonstrates that 92% or more of the existing accounts (accounts that have transaction history in the previous months) have kept the same archetype from the previous months which indicates the archetype assignment is fairly stationary from month to month, and if more stationarity is desired, larger document sizes can be utilized.

TABLE 1

Stable Archetype Assignment for Accounts

| | Go-live month 1 | Go-live month 2 | Go-live month 3 |
|---|---|---|---|
| No Change in Account: Same Archetype Assignment for Existing Accounts | 92% | 94% | 95% |

For the analysis, the transaction data can be chosen from go-live month 1 for the false positive reduction study. For the sake of simplicity, this study uses a 10% sampled data (on both non-fraudulent and fraudulent accounts), and the following Table 2 summarizes the statistics of the sampled data.

TABLE 2

Summary of Sampled Data for Go-live Month 1

| | # of Fraudulent Accts | # of Legitimate Accts | Fraud Rate |
|---|---|---|---|
| Go-live Month 1 | 945 | 321309 | 0.3% |

In some implementations, a simplistic profiling methodology can be used to build the baseline rules for transaction monitoring, much like what exists in most conventional anti-money laundering (AML) transaction monitoring scenarios. In a preferred exemplary implementation, only rules based on a continuous value, e.g. dollar amount, are used. There is a total of 7 rules applied in this system, while those having skill in the art would recognize that any number and types of rules can be used, which benefit the methodology:

Rule1: Ratio of current dollar amount and the average dollar amount in the past 1 month>=threshold 1

Rule2: Ratio of the maximum and the minimum dollar amount during the past 1 hour>=threshold 2

Rule3: The maximum dollar amount in the past 4 hours>=threshold 3

Rule4: The average dollar amount in the past 1 day>=threshold 4

Rule5: Ratio of average dollar amount during the past 1 hour and the average dollar amount during the past 1 day>=threshold 5

Rule6: Difference of maximum and minimum dollar amount within the past 4 hours>=threshold 6

Rule7: Ratio of average dollar amount during the past 4 hours and the average dollar amount during the past 1 week>=threshold 7

The system was developed using account-level fraud tagging. False positives are only tracked on non-fraud accounts, i.e. accounts that have no fraudulent transactions for the entire transaction history up till the analysis period. In the example, it can be assumed that a case is created if any transaction for an account gets flagged by any single rule.

Figure 3:
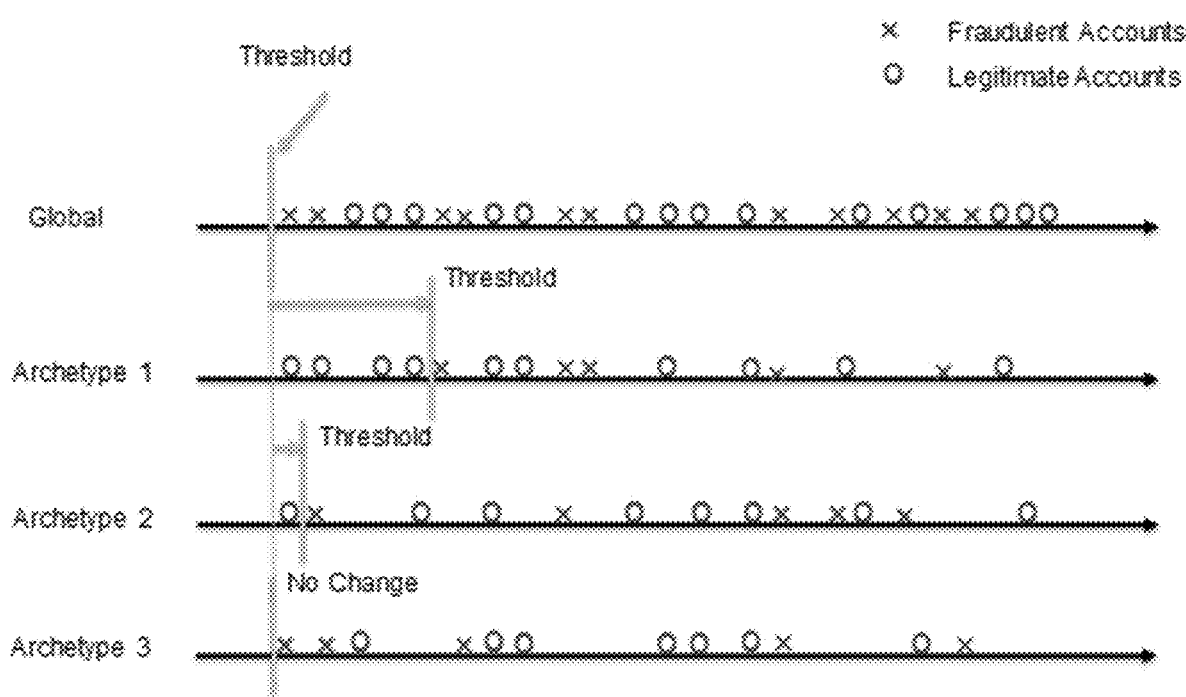
FIG. 3 illustrates an example of naïve rules optimization of a single rule scenario to reduce false positives, based on soft-segmentation using real-time archetype assignment with zero true positive detection loss.

The methodology for the soft-segmentation based rules optimization with zero detection loss can be illustrated in FIG. 3. The baseline is defined by setting the default thresholds for all 7 rules globally. These global rule settings determine all the fraudulent accounts detected for the rule system as a baseline, and the default thresholds applied to the 7 scenario rules. Then, using the assigned archetypes, different thresholds can be applied based on each of the different archetypes and their unique account membership.

In the example, the search for a new threshold will stop before any of the fraud accounts that were previously detected by the global system is missed. For example, archetype 1 in FIG. 3 shows that the first fraudulent account occurs at a much higher value of the rule threshold, such that quite a few false positives can be avoided when the threshold is moved higher without missing any detected fraud accounts for that archetype class. For archetype 2, the threshold can be moved higher, but no substantial false positive is saved due to the minor threshold value difference between the first fraud account and the first legitimate account. Archetype 3 shown in FIG. 3 is a scenario when the threshold cannot be altered without missing the first fraud account. Otherwise, previously detected fraud accounts will be missed.

This rules optimization system is based on soft-segmentation with zero detection loss, taking advantage of having a different density of false positives and true positives, as each archetype is a sampling of the global distribution, thus the thresholds can be moved to save false positives due to the distribution of true-positives being different. Note, however, FIG. 3 illustrates a naïve threshold setting scenario in which only a single rule scenario is considered, where the no-change in the threshold for Archetype 3 does not reflect that the first missed fraud account may be detected at a more advantageous threshold for a different rule scenario possibly allowing the rule scenario in FIG. 3 to leave some frauds at the threshold undetected (as they would be detected by other rules scenarios), thus allowing a system to further increase thresholds and remove false positives more optimally.

Figure 4:
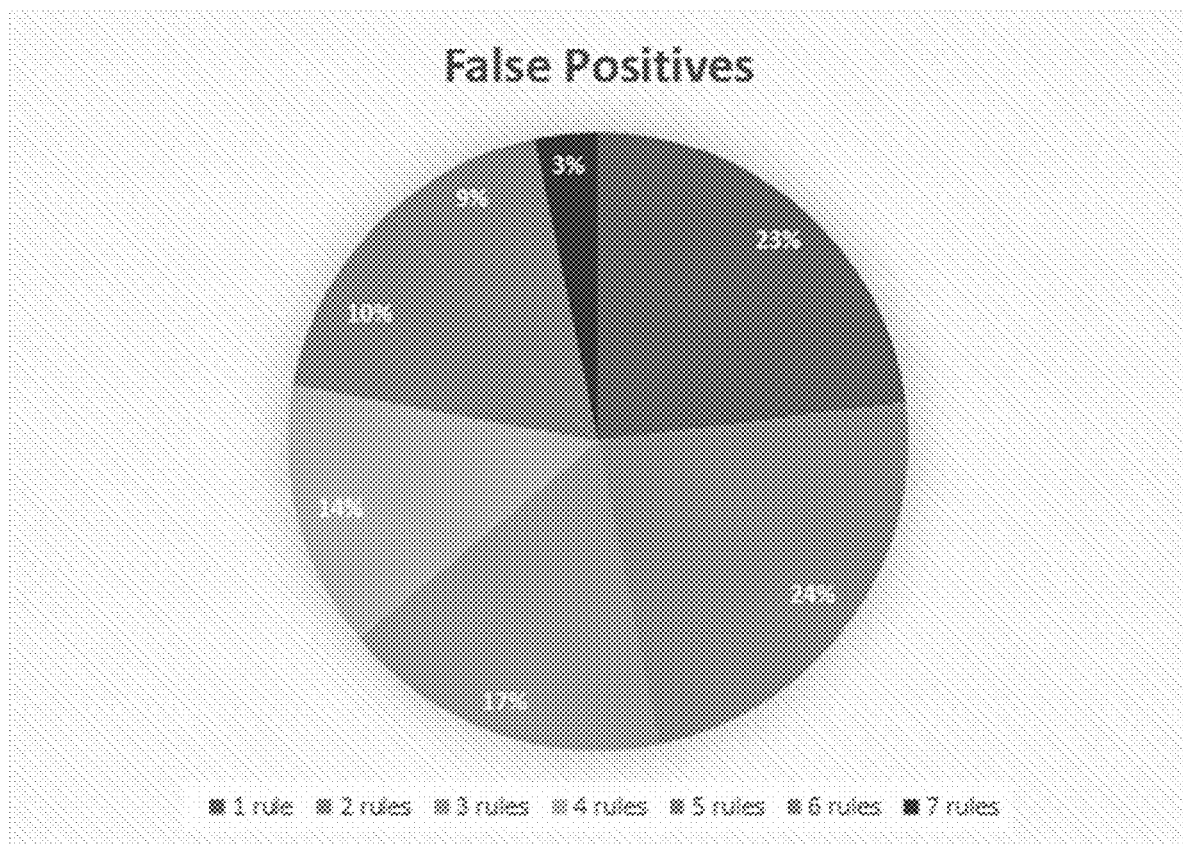
FIG. 4 illustrates an overlap of rules that identify false positives.

In one example, the first month after go-live can be used for archetype assignment. For the first month after go-live, sampled data (on both fraudulent and non-fraudulent accounts) which contains roughly 321k existing accounts (with the account-level fraud rate being 0.3%), there are a total of 130k accounts marked as false positives determined by global thresholds of the baseline 7-rule system. Those false positives accounts may be flagged by a single rule or multiple rules. FIG. 4 shows how many rules fired that evoked false positives. FIG. 4 demonstrates that 23% of false positives are identified by a single rule and 24% are identified by two rules, whereas 3% of false positives are flagged by all 7 rules during the scoring month. The soft segmentation and the rules overlap allow room for reduction in false positives and adjustments of rules thresholds at the archetype level.

Figure 5:
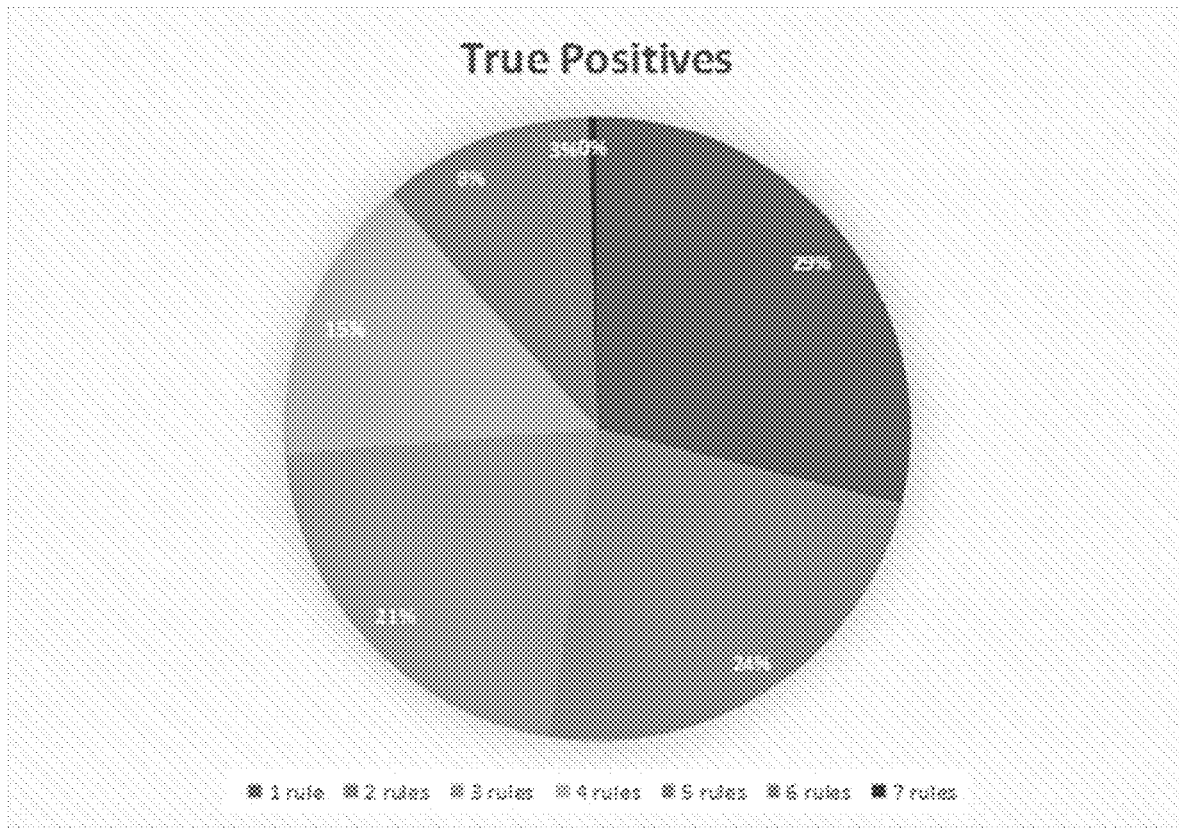
FIG. 5 shows an overlap of rules that identify true positives, in accordance with implementations described herein.

This 7-rule system provided 44% detection rate of all frauds for the sampled data at the account level, the exercise is to maintain the same detected True-Positives while reducing false positives. FIG. 5 shows the fraudulent True Positive detection and overlapping among the rules. All rules systems miss frauds, and the 7-rule system misses 56% of the frauds that could be better addressed by using analytic models to optimize larger true-positive fractions.

There are two categories for either True or False Positives—those flagged by a single rule or multiple rules. For single-rule detection, we are not allowed to miss the True Positives on rules where that rule is the only one to detect the True Positives. This is the naïve scenario illustrated in FIG. 3 that no True Positives will be caught by other rules. Whereas in a scenario when True Positives were flagged by multiple rules, the first step is to optimally remove True Positives to single-rule detection. Then use the strategy described in FIG. 3 to move the threshold, thus removing optimal false positives. Because 71% of the true positives were detected by multiple rules (FIG. 5), this allows true positives shifted from multiple-rule detection to single-rule detection, which often causes similar shift for false positives. The shift for both true and false positives can be realized by only focusing on the single-rule True Positives at the time of tuning a rule, i.e. any multiple-rule detected True Positive before the first single-rule True Positive is assumed to be caught later by other rule(s), and all multiple-rule detected True Positives after the first single-rule True Positive are removed from the dataset to relax the restrains for later rules to be adjusted. Once shifted to single-rules, moving the threshold such that they are not detected would mean that the False Positive account is not flagged by any rule. FIG. 5 demonstrates that 29% of true positives are identified by a single rule and 24% are identified by two rules, whereas only 2 fraudulent accounts are flagged by all 7 rules during the scoring month.

Each rule threshold is then re-estimated based on the mixture of single rule true and false positives associated with that archetype. The algorithm will allow adjusting the rules scenario thresholds until one would miss the first True Positive in the archetype grouping. In general, this process is started for the most inefficient (highest false positive ratio rule) and then repeated for the next high false positive ratio rule, and so on. If there are rules without any single-rule true positive detection those rules would be dropped (Rule 6 in FIG. 6). In this case, Rule 6 may be removed, and all the false positives caused only by Rule 6 will disappear and some true and false positives shared between Rule 6 and other rules would change the distribution of single-rule true and false positives. (see FIG. 7). This process can repeat until all rules to be adjusted have at least one true positive flagged by a single rule. At that point the thresholds can be moved as according to the method described above with reference to FIG. 3.

The following Table 3 summarizes the false positive reduction for the 7-rule based system using soft-clustering methodology. It is shown that applying this methodology, the overall false positives can be reduced by 11% while the true positive fraud detection is unchanged. Since each account can only belong to one archetype, none of the true or false positives overlaps across archetypes.

TABLE 3

Summary of Sampled Data Before and After Applying Rule Optimization.

| | Baseline | | With Rule Optimization | | |
| --- | --- | --- | --- | --- | --- |
| | True Positives | False Positives | True Positives | False Positives | FP Reduction |
| Archetype 1 | 29 | 8595 | 29 | 6645 | 23% |
| Archetype 2 | 116 | 29952 | 116 | 28958 | 3% |
| Archetype 3 | 15 | 4346 | 15 | 3545 | 18% |
| Archetype 4 | 35 | 6498 | 35 | 5943 | 9% |
| Archetype 5 | 36 | 19258 | 36 | 16423 | 15% |
| Archetype 6 | 32 | 13562 | 32 | 10751 | 21% |
| Archetype 7 | 91 | 23042 | 91 | 22183 | 4% |
| Archetype 8 | 13 | 4933 | 13 | 3925 | 20% |
| Archetype 9 | 42 | 15668 | 42 | 14641 | 7% |
| Archetype 10 | 10 | 4610 | 10 | 3559 | 23% |
| Total | 419 | 130464 | 419 | 116573 | 11% |

Table 3 shows that all the true positives that were detected by the baseline rule set were not changed after rule optimization. Meanwhile, the false positives were significantly improved compared with the baseline. Different archetypes showed various effectiveness on false positive reduction, as the methodology chart indicates previously in FIG. 3, FIG. 6 and FIG. 7.

A system and method described herein focuses on soft-segment based rules optimization that can mitigate the overall false positives while maintaining 100% true positive detection. The soft clustering allows real-time re-assignment of an account to a dominate archetype behavior. Rule optimization based on a logical order with more relaxation on thresholds for the most inefficient rules is performed within each archetype. For the sampled data in one example, the rule optimization provides 11% false positive reduction compared to the baseline rule system. The method can be used to reduce false positives for any rule-based detection system in which the same true positive detection is required.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying FIG.s and/or described herein do not necessarily require the particular order shown, or sequential order, to achieve desirable results. Other implementations may be within the scope of the following claims.

What is claimed is:

1. A method of reducing false positives in financial crime detection while maintaining the same true positive detected in an existing financial crime detection system, the method comprising:
    defining, by at least one computer processor, a unique dictionary of words within a set of transaction data representing transactions associated with accounts, the transaction data comprising categorical field data and continuous field data, each word defined in the dictionary comprising transaction data from one or more categorical fields and one or more continuous fields for a given customer for a given transaction;
    soft-segmenting, by the at least one computer processor using at least one topic model, the dictionary of words to determine semantic structures underlying the one or more transactions, and to determine entity behavior archetypes associated with the one or more accounts based on the determined semantic structures according to the topic model, the entity behavior archetypes representing transactional behavior patterns across all of the one or more accounts based on the transaction data, the topic model being trained using only non-financial crime accounts of the one or more accounts, the soft-segmenting producing a global learned distribution for each word from the defined dictionary in an archetype space such that words in the dictionary are associated with archetypes at different probabilities;
    storing, by the computer processor, the entity behavior archetypes in a data store accessible by the computer processor, the storing including associating the entity behavior archetypes with each associated one or more accounts and associated transaction data;
    deriving, by the at least one computer processor after receiving new transaction data in an online environment, updated latent archetypes from the new transaction data and previous latent archetypes in the archetype space according to the entity behavior archetypes stored in the data store, the deriving comprising executing a Bayesian inference algorithm; and
    storing the updated latent archetypes in the data store, the updated latent archetypes being associated with the one of the one or more accounts being available to the system.

2. The method in accordance with claim 1, wherein the behavior determined from the new transaction data based on the latent archetypes according to the entity behavior has a different distribution of false positives and true positives of financial crime detection based on the one or more accounts transaction behavior and the assigned entity behavior archetypes.

3. The method in accordance with claim 2, wherein a subpopulation of the one or more accounts are associated with a dominant archetype.

4. The method in accordance with claim 3, wherein rule parameters of the financial crime detection system are adjusted based on the subpopulation of the one or more accounts that are assigned to each dominant archetype, and wherein the rule parameters are tuned to identify and remove false positives while maintaining full detection of true positives of the financial crime system.

5. The method in accordance with claim 4, wherein the tuning of the rule parameters comprises optimizing a first rule parameter that flags largest number of unique false positives while maintaining any true positives uniquely identified only by that rule.

6. The method in accordance with claim 5, wherein the tuning of the first rule parameter removes unique false positives identified to cause a redistribution of unique false positives and unique true positives across other rules.

7. The method in accordance with claim 6, further comprising iterating, by the computer processor, through remaining rules until all rules uniquely identify at least one true positive, and where further rule parameters are sequentially adjusted in order of rules with the largest number of unique false positives while maintaining true positive detection.

8. The method in accordance with claim 1, wherein the topic model is specified as a Latent Dirchlet Allocation (LDA) model.

9. The method in accordance with claim 8, wherein the training of the LDA model further comprises forming, by the computer processor, a dictionary on which words are associated with a distribution archetypes of the entity behavior archetypes based on Bayesian probabilities.

10. The method in accordance with claim 1, wherein the categorical field data comprises a Merchant Category Code (MCC) and/or a Point of Sale (POS) Entry Mode associated with one of the one or more transactions.

11. The method in accordance with claim 1, wherein the continuous field data comprises a dollar amount of one of the one or more transactions, with the continuous value being mapped to one or more categorical bins.

12. The method in accordance with claim 1, wherein updating the entity behavior archetypes using the latent archetypes associated with the one of the one or more accounts occurs in real-time.

13. A system for reducing false positives in financial crime detection while maintaining the same true positive detected in an existing financial crime detection system, the system comprising
 a programmable processor; and
 a non-transitory, machine-readable medium storing instructions that, when executed by the processor, cause the at least one programmable processor to perform operations comprising:
  defining, by at least one computer processor, a unique dictionary of words within a set of transaction data representing transactions associated with accounts, the transaction data comprising categorical field data and continuous field data, each word defined in the dictionary comprising transaction data from one or more categorical fields and one or more continuous fields for a given customer for a given transaction;
  soft-segmenting, by the at least one computer processor using at least one topic model, the dictionary of words to determine semantic structures underlying the one or more transactions, and to determine entity behavior archetypes associated with the one or more accounts based on the determined semantic structures according to the topic model, the entity behavior archetypes representing transactional behavior patterns across all of the one or more accounts based on the transaction data, the topic model being trained using only non-financial crime accounts of the one or more accounts, the soft-segmenting producing a global learned distribution for each word from the defined dictionary in an archetype space such that words in the dictionary are associated with archetypes at different probabilities;
  storing, by the computer processor, the entity behavior archetypes in a data store accessible by the computer processor, the storing including associating the entity behavior archetypes with each associated one or more accounts and associated transaction data;
  deriving, by the at least one computer processor after receiving new transaction data in an online environment, updated latent archetypes from the new transaction data and previous latent archetypes in the archetype space according to the entity behavior archetypes stored in the data store, the deriving comprising executing a Bayesian inference algorithm; and
  storing the updated latent archetypes in the data store, the updated latent archetypes being associated with the one of the one or more accounts being available to the system.

14. The system in accordance with claim 13, wherein the behavior determined from the new transaction data based on the latent archetypes according to the entity behavior has a different distribution of false positives and true positives of financial crime detection based on the one or more accounts transaction behavior and the assigned entity behavior archetypes.

15. The system in accordance with claim 14, wherein a subpopulation of the one or more accounts are associated with a dominant archetype.

16. The system in accordance with claim 15, wherein rule parameters of the financial crime detection system are adjusted based on the subpopulation of the one or more accounts that are assigned to each dominant archetype, and wherein the rule parameters are tuned to identify and remove false positives while maintaining full detection of true positives of the financial crime system.

17. The system in accordance with claim 16, wherein the tuning of the rule parameters comprises optimizing a first rule parameter that flags largest number of unique false positives while maintaining any true positives uniquely identified only by that rule.

18. The system in accordance with claim 17, wherein the tuning of the first rule parameter removes unique false positives identified to cause a redistribution of unique false positives and unique true positives across other rules.

19. The system in accordance with claim 18, wherein the operations further comprise iterating through remaining rules until all rules uniquely identify at least one true positive, and where the rule parameters are sequentially adjusted in order of rules with the largest number of unique false positives while maintaining true positive detection.

20. The system in accordance with claim 13, wherein the topic model is specified as a Latent Dirchlet Allocation (LDA) model.

21. The system in accordance with claim 20, wherein the training of the LDA model further comprises forming, by the computer processor, a dictionary on which words are associated with a distribution archetypes of the entity behavior archetypes based on Bayesian probabilities.

22. The system in accordance with claim 13, wherein the categorical field data comprises a Merchant Category Code (MCC) and/or a Point of Sale (POS) Entry Mode associated with one of the one or more transactions.

23. The system in accordance with claim 13, wherein the continuous field data comprises a dollar amount of one of the one or more transactions, with the continuous value being mapped to one or more categorical bins.

24. The system in accordance with claim 13, wherein updating the entity behavior archetypes using the latent archetypes associated with the one of the one or more accounts occurs in real-time.

\* \* \* \* \*

UNITED STATES PATENT AND TRADEMARK OFFICE
CERTIFICATE OF CORRECTION

| | | |
|---|---|---|
| PATENT NO. | : 11,694,292 B2 | |
| APPLICATION NO. | : 16/395112 | |
| DATED | : July 4, 2023 | |
| INVENTOR(S) | : Scott Michael Zoldi et al. | |

It is certified that error appears in the above-identified patent and that said Letters Patent is hereby corrected as shown below:

On the Title Page

In (72) Inventor's: please delete "Qing Lin" and add --Qing Liu--

Signed and Sealed this
Third Day of October, 2023

Katherine Kelly Vidal
*Director of the United States Patent and Trademark Office*